United States Patent [19]

Rappa

[11] 4,283,869
[45] Aug. 18, 1981

[54] PORTABLE CHARTHOLDER AND TABLE

[76] Inventor: Leonard F. Rappa, P.O. Box 656, Linden, N.J. 07036

[21] Appl. No.: 29,560

[22] Filed: Apr. 12, 1979

[51] Int. Cl.³ .............................................. G09F 3/18
[52] U.S. Cl. .................... 40/10 D; 40/20 A; 40/904
[58] Field of Search ................ 40/10 R, 10 D, 20 A, 40/158A, 586, 904, 591, 593, 159

[56] References Cited

U.S. PATENT DOCUMENTS

| | | | |
|---|---|---|---|
| 1,153,094 | 9/1915 | McGinty | 40/10 R |
| 1,389,587 | 9/1921 | Hilborn | 40/606 |
| 2,659,991 | 11/1953 | Strayer | 40/584 X |
| 3,509,653 | 5/1970 | Hummel | 40/591 |
| 3,533,178 | 10/1970 | Strohmaier | 40/593 |
| 4,051,615 | 10/1977 | Gosanko et al. | 40/10 D |
| 4,157,626 | 6/1979 | Bedinghaus | 40/904 X |
| 4,161,834 | 7/1979 | Hendricks | 40/152.1 X |

Primary Examiner—John F. Pitrelli
Assistant Examiner—G. Lee Skillington
Attorney, Agent, or Firm—Roland A. Dexter

[57] ABSTRACT

A portable chartholder and table, particularly adapted to provide a readily viewable chart for sailing, his two rigid, flat and transparent members secured together by manually operable securing means having a release mechanism, one or more flexible grab handles extending from the perimeter of said members and multiple cushioning-supporting means secured on the perimeter of said members whereby said chartholder is protected against injury and/or displacement from a supporting surface during heavy weather.

6 Claims, 4 Drawing Figures

PORTABLE CHARTHOLDER AND TABLE

The Portable Chartholder and Table is an article of manufacture consisting of two flat transparent surfaces held together by and separable by means of manually operable securing and release mechanisms. The flat rigid transparent viewing surfaces have on their perimeters, slip resistant supporting and cushioning devices with hollow centers through which pass the manually operable securing and release mechanisms. The hollow centers of the supporting and cushioning devices provide recesses which accommodate and envelop the securing and release mechanisms and prevent any protrusion of those mechanisms beyond the outer surface plane of the supporting and cushioning devices. There are also flexible grab handles extending from the perimeter of the assembled Portable Chartholder and Table.

SUMMARY OF THE INVENTION

The Portable Chartholder and Table is a navigational aide or device consisting of two flat, rigid transparent viewing surfaces held together, and separable, by means of manually operable securing and release mechanisms. Any nautical, aeronautical, or surface chart, map, diagram or other graphic material, may be inserted between the viewing surfaces, and will be held flat and stationary. Because both viewing surfaces are transparent, both sides of any material held between the viewing surfaces are immediately viewable by simply turning the invention over and viewing its opposite side. This also allows for the insertion of material between the viewing surfaces on a back to back basis, or folded, and permits maximum exposure through both viewing surfaces, with each viewing surface immediately accessible by simply turning the invention over to its opposite side.

Courses and distances may be calculated and plotted on the viewing surfaces with any ordinary "china marker", grease pencil or similar marking device. Such markings on the viewing surface may be removed and erased with any ordinary paper tissue, paper towel, or piece of cloth. Once such markings are removed, the viewing surfaces remain clear and transparent, and new or corrected courses and distances may be calculated and plotted.

The invention is protected against breakage of its own parts and against damaging or breaking other objects with which it might come into contact if dropped or thrown about in heavy seas, air turbulence or the like. This protection is provided by cushioning devices located around the perimeter of the invention.

The invention has flexible, removable grab handles which facilitate grabbing, lifting, moving, and carrying the invention about.

BRIEF DESCRIPTION OF THE DRAWINGS

For a fuller understanding of the nature of the invention, reference should be made to the detailed description taken in connection with the accompanying drawings in which.

DETAILED DESCRIPTION OF THE INVENTION

Figure 1:
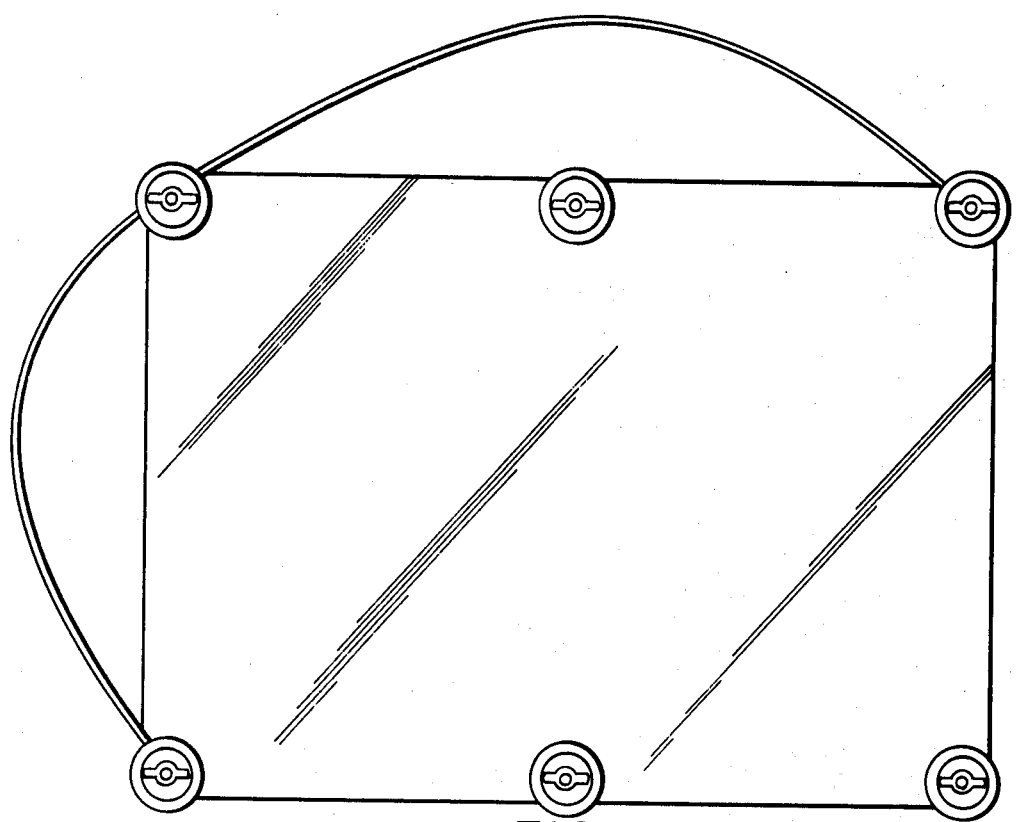
FIGS. 1 and 2 are top and bottom plan views of an assembled portable chartholder and table.
Figure 2:
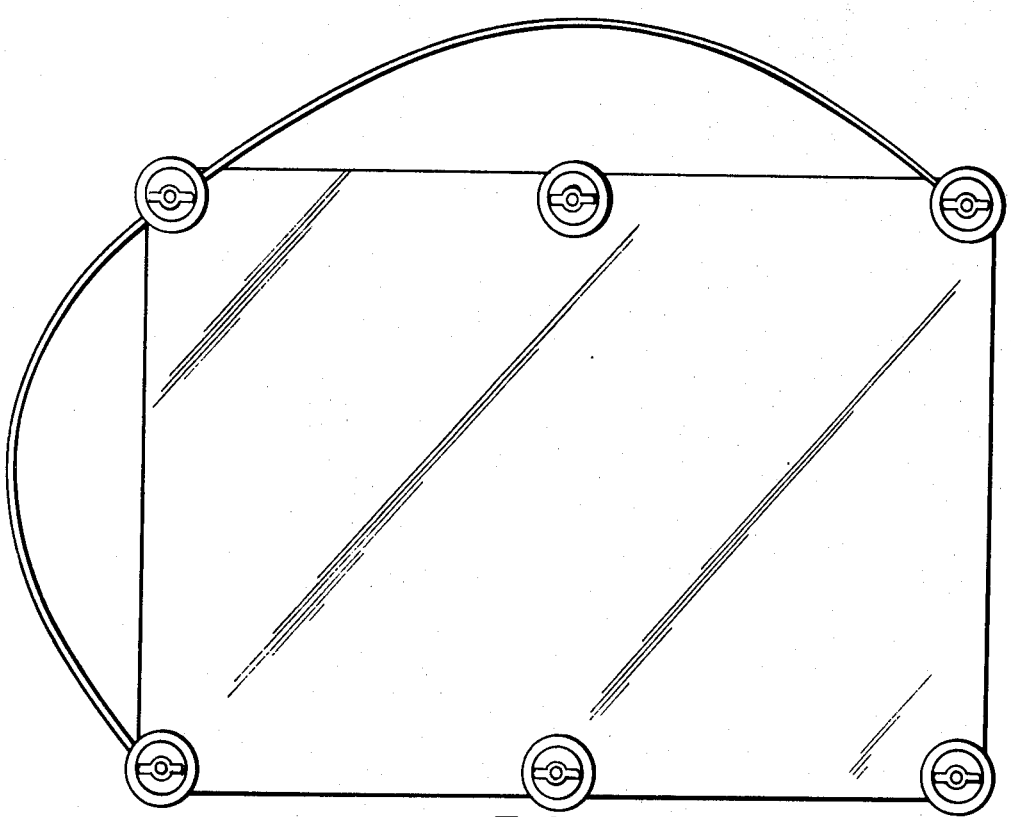
Figure 3:
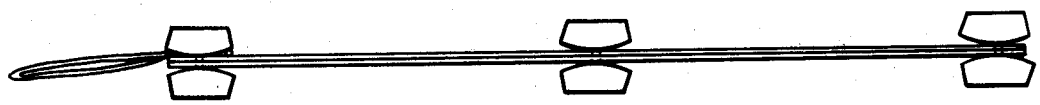
FIG. 3 is a side view of said chartholder and table.
Figure 4:
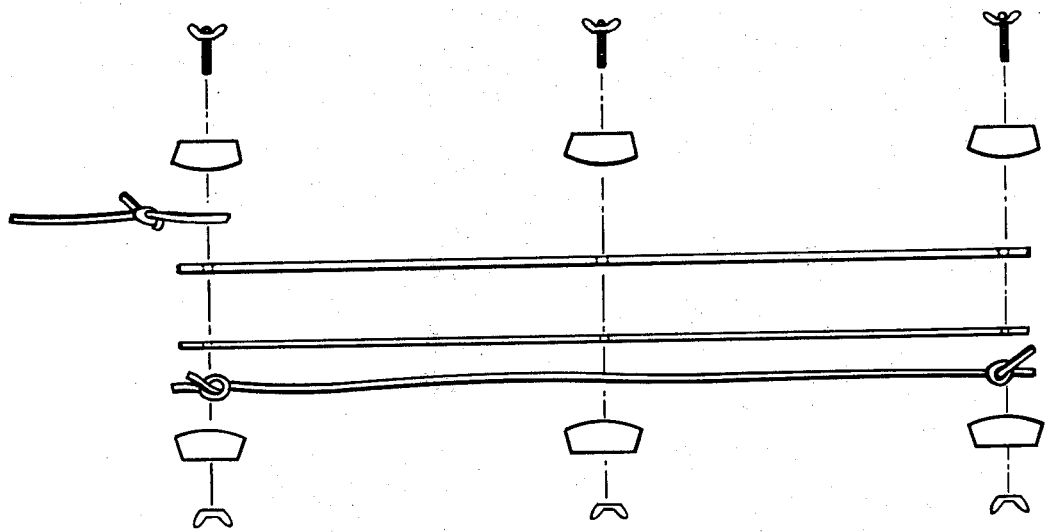
FIG. 4 is an exploded side view of said chartholder and table.

The Portable Chartholder and Table is a navigational aid or device. It consists of two flat, rigid, transparent viewing surfaces, held together, and separable, by means of manually operable securing and release mechanisms. FIGS. 1 and 2 of the drawings show top and bottom plan views of the assembled Portable Chartholder and Table. As shown, the viewing surfaces are of identical size, are transparent, and fit onto each other by aligning their respective edges with each other. The viewing surfaces also contain holes which pass through them, and through which pass the manually operable securing and release mechanisms. FIG. 3 and FIG. 4 show the holes as the manually operable securing and release mechanisms which pass through them. The holes through each viewing surface align with each other in order to allow the securing and release mechanisms to secure the flat, rigid transparent surfaces to each other. They also secure at the perimeter of the viewing surfaces slip resistant supporting and cushioning devices. Each of these slip resistant, supporting and cushioning devices has a hole through its center to allow passage of the manually operable securing and release mechanisms. The mechanisms then not only secure the viewing surfaces together, but secure the slip resistant supporting and cushioning devices to the viewing surfaces. FIG. 4 shows an exploded side view of the Chartholder and Table and the relationship of the aforementioned parts to each other. FIG. 3 shows a side view of the assembled Chartholder and Table showing the relationship of the aforementioned parts to each other when the Chartholder and Table is in its secured position. The slip resistant supporting and cushioning devices also have hollowed out centers which fully envelop and accomodate the portions of the manually operable securing and release mechanisms which extend above and out from each viewing surface. This may be seen in FIG. 1, FIG. 2 and FIG. 3. This prevents the securing and release mechanisms from scratching or marring any surface on which the Chartholder and Table may be placed, or with which it might otherwise come into contact. This arrangement eliminates the potential hazard of scratching, marring, or otherwise damaging any other such surfaces by the securing and release mechanisms.

The slip resistant supporting and cushioning devices, when secured to the viewing surfaces by the securing and release mechanisms, themselves extend beyond the perimeter of the viewing surfaces. This may be seen in FIG. 1 and FIG. 2. This extension of the slip resistant supporting and cushioning devices provides a perimeter cushioning and shock absorbing mechanism. In this fashion, the supporting and cushioning devices prevent the flat rigid transparent surfaces from causing damage, and from being damaged themselves, if the entire invention is dropped, or tossed or thrown about by the operation of wind, water or other forces in rough going on any vessel, vehicle, aircraft or other conveyance where the portable Chartholder and Table may be in use. This is particularly significant in the case of use on fiberglass boats, where the fiberglass structural material in the cabin or cockpit would be subject to being scratched, chipped, or cracked by contact from any chartholder or table not cushioned or protected as is the portable Chartholder and Table herein described.

The portable Chartholder and Table is also fitted with flexible grab handles on two of its edges. This is illustrated in FIG. 1 and FIG. 2. These flexible grab handles are secured by having the manually operable securing and release mechanisms pass through loops at the outermost end of each such flexible grab handle. The loops on the ends of the flexible grab handles fit onto the viewing surfaces over the holes in the viewing surface through which pass the securing and release mechanisms. The slip resistent supporting and cushioning devices fit over the aforementioned end loops on the grab handles, and the securing and release mechanisms pass through these loops, after passing through the holes in the centers of the supporting and cushioning devices and through the holes in the viewing surfaces. FIG. 4 illustrates the relationship between the component parts herein mentioned and shows the flexible grab handles as described. These grab handles facilitate grabbing, lifting, moving and carrying the invention about. They also allow for decorative storage of the Portable Chartholder and Table by allowing it to be hung in picture fashion horizontally on any bulkhead, wall, or other horizontal surface.

The distinguishing features of the Portable Chartholder and Table herein described include, but are not limited to the following features and characteristics:

I. RIGID, TRANSPARENT, VIEWING SURFACES

The rigid, transparent, viewing surfaces of the invention allow charts and other graphic material to be held perfectly flat and immovable. This allows a true distortion free view of the material secured between the viewing surfaces. Because both viewing surfaces are transparent, maximum exposure of the charts or other materials is possible. Moreover, since most charts are printed on both sides, the invention allows the user to view both sides of a single chart without having to remove the chart and turn it over. All the user need do is to turn the entire invention over to expose to view the opposite side of the material secured between the two viewing surfaces. The nature of the viewing surfaces also allows the plotting and charting of courses and distances right on the viewing surfaces, making unnecessary repeated marking and erasing of the charts themselves. The viewing surfaces may be marked with a standard china marker or grease pencil, which markings are removable from the viewing surfaces by means of a normal paper towel or tissue or any ordinary piece of cloth. The Chart surfaces also provide protection for charts secured between them from damage or distortion which might be caused by wind, water, or other elements.

II. CUSHIONING AND SUPPORTING DEVICES.

A unique feature of the invention is that it has on its perimeter cushioning and supporting devices which protect against breakage of the invention's own component parts, as well as protect other objects and surfaces from being marred, scratched, cracked, or broken by the invention. Therefore, if the invention is tossed about in heavy weather in a boat or in an aircraft, or is dropped by the user, the invention itself is protected against damage, and the parts of the boat or aircraft with which the invention comes into contact will not be marred or damaged by it. The cushioning and supporting devices also prevent the component parts of the invention from marring any other horizontal plane surface, such as a table top or a stationary chart table on which the invention might be used. The cushioning and supporting devices when used in that way also provide substantial slip resistence, so that the invention will not easily slip from any stationary chart table, cockpit seat, or any horizontal plane on which it is placed for use.

III. SECURING AND RELEASE MECHANISMS

The securing and release mechanisms are manually operable. This allows the user to quickly separate the viewing surfaces to adjust or change any chart or other material being used in conjunction with the invention. The securing and release mechanisms have adjustable tension which allows the user to tightly secure all component parts to each other by manually tightening the securing and release mechanisms. The securing and release mechanisms may also be operated with the use of common hand tools such as pliers and screwdrivers if the user desires to do so.

IV. FLEXIBLE GRAB HANDLES

The flexible grab handles extending out from and along the outer edges of the invention facilitate grabbing, moving, carrying, and lifting of the invention. The flexible grab handles also permit the invention to be stored horizontally by hanging it, picture fashion, on a bulkhead, wall, or any other horizontal surface. This also permits the invention to be used as a decorative item by hanging it, as one might hang a picture, on a wall at home, or elsewhere.

On an overall basis, the invention is completely portable, and may be used at any angle or used flat, either as a lap table, or propped up against, or laid flat upon any other surface in a cockpit or cabin of a boat, an aircraft, or any other type of vehicle.

I claim:

1. A portable chartholder and table comprising two rigid and transparent planar members secured together by manually operable securing means having a release mechanism, at least one flexible grab handle connected to at least one of said planar members and multiple cushioning-supporting means secured on the perimeter of said planar members, said planar members cooperating in a manner whereby a chart can be positioned contiguous with an inner surface of each of said planar members and readily read by the helmsperson of a moving boat.

2. A portable chartholder and table according to claim 1 wherein each of said cushioning-supporting means have a slip-resistent exterior concave surface with a hollowed out center which fully envelop and accommodate the portions of said securing means exterior of the surface of said planar member and are of a cushioning material and extend beyond the perimeter of the secured planar members.

3. A portable chartholder and table according to claim 1 wherein said securing means pass through holes in said planar members and said grab handles have a loop at the outermost ends of each of said handles positioned over one of said holes whereby each of said handles is secured by said securing means.

4. A portable chartholder and table according to claim 3 wherein said grab handles are removable, and extend out from and along the outer edges of said table.

5. A portable chartholder and table according to claim 1 wherein said flexible grab handles are on two of its edges.

6. A portable chartholder and table according to claim 1 wherein said securing means have adjustable tension.

* * * * *